USOO5094188A

United States Patent [19]
Wolak

[11] Patent Number: 5,094,188
[45] Date of Patent: Mar. 10, 1992

[54] PET LITTER BOX

[76] Inventor: Ronald G. Wolak, 221 Parkland Dr., Rochester Hills, Mich. 48063

[21] Appl. No.: 587,518

[22] Filed: Sep. 24, 1990

Related U.S. Application Data

[63] Continuation of Ser. No. 383,456, Jul. 24, 1989, abandoned, which is a continuation-in-part of Ser. No. 290,702, Dec. 27, 1988, Pat. No. 5,027,748.

[51] Int. Cl.⁵ ............................................. A01K 67/00
[52] U.S. Cl. ................................................... 119/168
[58] Field of Search ................ 119/168, 169, 170, 165; 229/122

[56] References Cited

U.S. PATENT DOCUMENTS

| | | | |
|---|---|---|---|
| 3,377,990 | 4/1968 | Mitchell | 119/1 |
| 3,428,026 | 2/1969 | Sohmers et al. | 119/19 |
| 3,482,546 | 12/1969 | Anderson | 119/1 |
| 3,885,523 | 5/1975 | Coleman | 119/1 |
| 3,993,241 | 11/1976 | Downing | 229/122 |
| 4,095,559 | 6/1978 | Griffith | 119/1 |
| 4,215,649 | 8/1980 | Vrobeck | 119/15 |
| 4,696,257 | 9/1987 | Neary et al. | 119/1 |
| 4,760,982 | 8/1988 | Cooke | 248/99 |
| 4,788,935 | 12/1988 | Balla et al. | 119/1 |
| 4,846,103 | 7/1989 | Brown | 119/1 |

Primary Examiner—Robert P. Swiatek
Assistant Examiner—Todd E. Manahan
Attorney, Agent, or Firm—Krass & Young

[57] ABSTRACT

There is disclosed herein a waste disposal system which includes a generally rigid support skeleton defining an interior space configured to receive refuse and a flexible, bag-like member supported by, and enclosing therewithin the support skeleton. The waste disposal system may be advantageously configured to provide a litter box for felines and the like.

4 Claims, 10 Drawing Sheets

PET LITTER BOX

This is a continuation of co-pending application Ser. No. 383,456, filed on Jul. 24, 1989, now abandoned, which is a continuation-in-part of U.S. patent application Ser. No. 290,702 filed Dec. 27, 1988, now U.S. Pat. No. 5,027,748.

FIELD OF THE INVENTION

This invention relates generally to containers for the collection and disposal of refuse. More particularly, the invention relates to a litter box for small animals; and most specifically, the present invention relates to a litter collection and disposal system for felines and the like, which eliminates problems associated with the handling and disposal of animal wastes.

BACKGROUND OF THE INVENTION

Since time immemorial domestic cats and humans have enjoyed a mutually beneficial relationship. In exchange for food and shelter, the cat provides its host with companionship and controls mice, rats and other vermin. For many years, cats primarily resided in barns, granaries, and other out-buildings on their host's property. However, as society becomes increasingly urban, domestic cats are spending more of their time in houses and apartments. It is not unusual in some settings, for a cat to live its entire life within the confines of a given house or apartment. Such intramural existence presents ever-increasing problems associated with the disposal of cat excreta.

Heretofore, it has been common for cat owners to provide their pets with a litter box, typically a shallow tray filled with sand or one of the various commercially available absorbent materials. The cat litter box is generally unsightly, dusty and odiferous and must be cleaned regularly if the cat is to use it. The various tasks associated with the cleaning and disposal of the contents of a litter box are one of the more unpleasant aspects of cat ownership. In addition to being a nuisance, disposal of cat wastes can be a health hazard. It has been found that cat feces can in some instances contain infectious agents harmful to humans. For example, it has been found that toxoplasmosis, an infection caused by the protozoan *Toxoplasmosis gondii* can be transmitted to humans from cat feces. This highly contagious agent can cause significant harm to various organs and is particularly harmful to pregnant women insofar as the infection can be transmitted, often with severe results, to a fetus.

Accordingly, it will be appreciated that there is a need for a cat litter system which will minimize human contact with cat excreta and which will present a sanitary and aesthetically pleasing aspect. Many approaches to the problem of cat litter have been implemented. There are various litter boxes which provide a shielded and/or deodorized environment. U.S. Pat. No. 4,771,731 discloses a cat litter system having a dual-tray and bag arrangement. The first tray is perforated and holds a body of cat litter material. The perforations allow urine to pass therethrough into an absorbent lined holding bag thereunder. The first tray and bag are supported in a second tray. Disposal of cat waste from this system still entails direct contact with litter material and further necessitates washing of the various components.

Various approaches to disposable litter systems have also been implemented. In some instances, disposable plastic liners are placed in litter trays to contain litter for disposal. Problems with these liners arise because cats are prone to claw holes in them. U.S. Pat. No. 4,779,567 and U.S. Pat. No. 4,763,603 both disclose litter trays fabricated from a disposable material and include therewith a plastic bag for disposal of the used litter. While both of these inventions minimize contact with litter and washing of litter trays, both leave the litter exposed to the ambient environment during use. Furthermore, it has been found that cats are prone to scatter litter about and spray urine while using such unshielded open trays.

Another approach to the problem of cat litter is represented in U.S. Pat. No. 4,683,839 which shows a cat litter disposal system configured to be hidden beneath a table and shielded from view by a table cloth. The cat litter system of the '839 patent further includes a litter tray disposed within a bag which is supported from its exterior by the framework of the table. This approach shields the litter box from view and prevents the dissemination of odor and infectious material. However, disposal of litter still entails dumping and washing of the tray. Furthermore, it has been found that plastic bag protectors of the type shown in the '839 patent are frequently torn by cats' claws with the resultant spillage of waste materials and release of odors.

Yet another litter box assembly is disclosed in U.S. Pat. No. 4,788,935. The litter box thereof is comprised of a rigid frame which is inserted into, and supported by, a plastic bag. The frame of the '935 patent includes a tray-like base portion with side portions extending therefrom. The frame must be fully erected before insertion into the bag, which makes use of the assembly difficult. Additionally, this particular litter box assembly relies upon the tensile strength of the bag to provide structural integrity.

It should be appreciated from the foregoing that there is still a need for an easy to install, use and dispose cat litter system which provides a relatively enclosed environment so as to minimize the spread of infectious organisms, odors and dust and to cover the unsightly aspects of the litter box. It is further desired that any such cat litter system should minimize the handling of soiled material. It would be of great commercial advantage to have a cat litter system which is cheaply produced and compact to store, which properties would lend the system to being marketed as a disposable item.

The present invention provides for an improved refuse collection and disposal container which is ideally suited for use as a litter box for cats and other such animals. The present invention comprehends a litter system comprised of a generally moisture impervious, bag-like member supported by an internal skeleton. The bag and skeleton cooperate to provide a totally enclosed environment for containing cat litter and waste. The system eliminates both the sight and smell of cat litter and the handling thereof. Furthermore, the litter system of the present invention is simple to produce and use and may be fabricated from relatively low cost materials so as to provide a readily disposable item. These and other advantages of the invention will be readily apparent from the drawings, discussion, description and claims which follow.

BRIEF DESCRIPTION OF THE INVENTION

There is disclosed herein a refuse container comprising a support skeleton defining an interior space which is configured to receive refuse. The container further comprises a flexible, bag-like member supported by, and enclosing therewithin, the support skeleton. In particular embodiments, the support skeleton is configured as a box-like member having a closed bottom and a plurality of sides joined to, and cooperating with, the bottom so as to partially enclose a refuse containing space.

In a particular embodiment, the refuse container is structured as a litter box for felines and the like and comprises a generally box-like support skeleton which includes a generally planar base and a wall member encircling the periphery of the base in a non-coplanar relationship therewith so as to define an interior space. The wall also includes an opening therethrough communicating with the interior space. The litter box further comprises a flexible, bag-like member enclosing, and supported by, the skeleton. The bag-like member may also have an opening therethrough generally aligned and communicating with the opening in the wall member. The skeleton may be configured as a collapsible element to allow for storage, assembly and/or disposal of the litter box. The litter box may include a deodorant material and may be provided prefilled with cat litter.

In yet other embodiments, the litter box may be configured to provide litter retaining means proximate the opening for minimizing scatter of litter from the interior space. The litter retaining means may be configured as a vestibule having a closed bottom, a pair of side walls, and a front wall. The vestibule projects from the wall member proximate the opening. In another embodiment, the base of the skeleton is generally rectangular and the wall member includes four walls which align with four edges of the base. Three of the walls are disposed at approximate right angles to the base and a fourth is disposed at an obtuse angle to the base. The fourth wall constitutes at least a portion of the litter retaining means.

In further refinements of the present invention, the litter box incorporates an odor-absorbent filter associated therewith. The skeleton and bag-like member each have a second opening therein. These openings are in alignment and the filter is disposed so as to occlude at least a portion of those openings.

DETAILED DESCRIPTION OF THE INVENTION

In its most basic form, the present invention includes a litter box assembly comprised of a support skeleton and a flexible bag. The skeleton is provided in a first, collapsed, generally planar form and is expandable to a self-supporting polyhedral shape which defines an interior volume. When in the collapsed form, the skeleton encloses substantially no interior space and is referred to as being in a generally planar configuration, it being understood that such configuration, as will be described in greater detail hereinbelow, may include one or more overlapping layers while still being regarded as "planar."

The skeleton may be readily expanded to a polyhedral configuration which at least partially encloses an interior volume. As will be explained in greater detail hereinbelow, this polyhedral shape may include an open-face as well as an opening configured to permit passage of the pet.

It is important to note that the skeleton is self-supporting in its expanded configuration. As such, it does not require the assistance of the bag or any other member to cause it to retain its shape. This feature contrasts the present invention with various prior art devices and confers significant advantages of stability and ease of use.

It is also important to note that the skeleton is readily and reversibly interchanged between its two configurations. In this manner, it may be easily placed in the bag when in its first configuration and expanded to its second configuration. Disposal is facilitated by returning the bagged box back to the first, planar configuration. In particular variations of the above, the skeleton may be configured to be expanded to an intermediate configuration for insertion into the bag prior to full assembly. Also, the skeleton may be configured to enclose a volume of litter material when in its first configuration.

Figure 1:
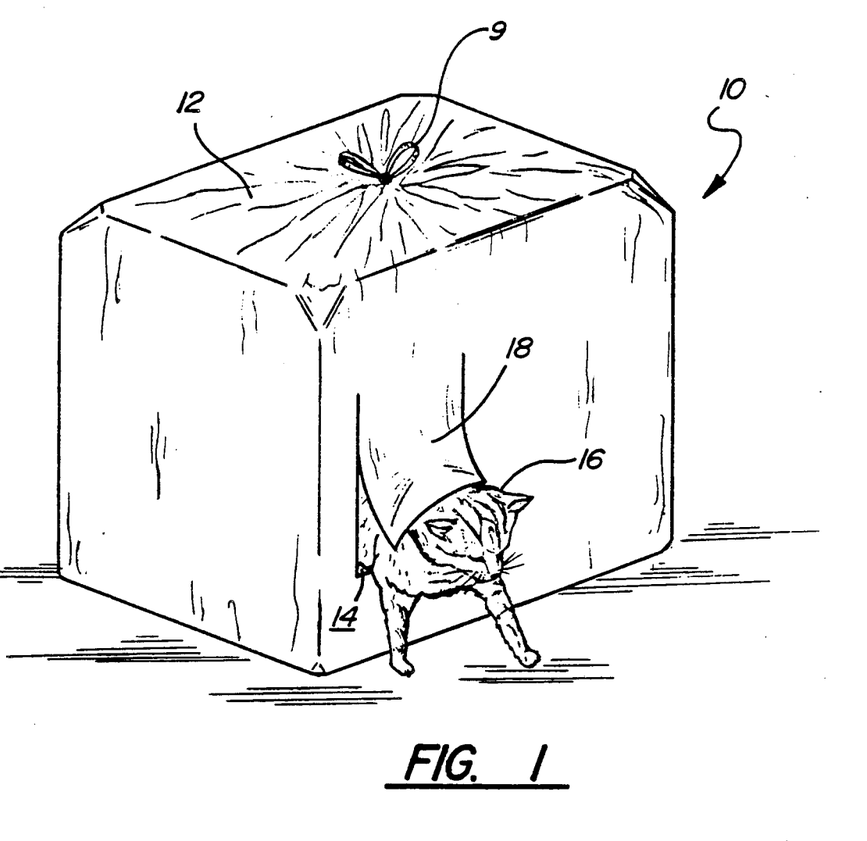
FIG. 1 is a perspective view illustrating a cat litter box of the present invention.

Referring now to FIG. 1, there is shown a cat litter box 10 structured in accord with the principles of the present invention. The litter box 10 includes a generally bag-like member 12 enclosing a support skeleton (not visible in this view) therewithin. The bag 12 is preferably a moisture impervious, relatively sturdy member, and in this embodiment is a 1.6 mil polyethylene bag generally similar to those sold for the disposal of trash. The bag 12 is tied shut at the top by a drawstring 9 and totally encloses the skeleton therewithin. The bag 12 has an opening 14 provided in one side thereof to allow passage of a cat 16. In the illustrated embodiment the opening 14 in the bag 12 is made so as to leave a depending flap of bag material 18 attached thereto to provide screening of the interior of the litter box 10. It has been found that cats generally prefer the privacy afforded by such screening. It should be noted that the bag, as supplied, will of necessity include one relatively large top opening through which the skeleton is inserted. By appropriately positioning the bag, this top opening may be positioned to allow passage of a cat. In another preferred embodiment, the bag may be provided with a second opening, (such as that illustrated at 14) for this purpose.

Figure 2A:
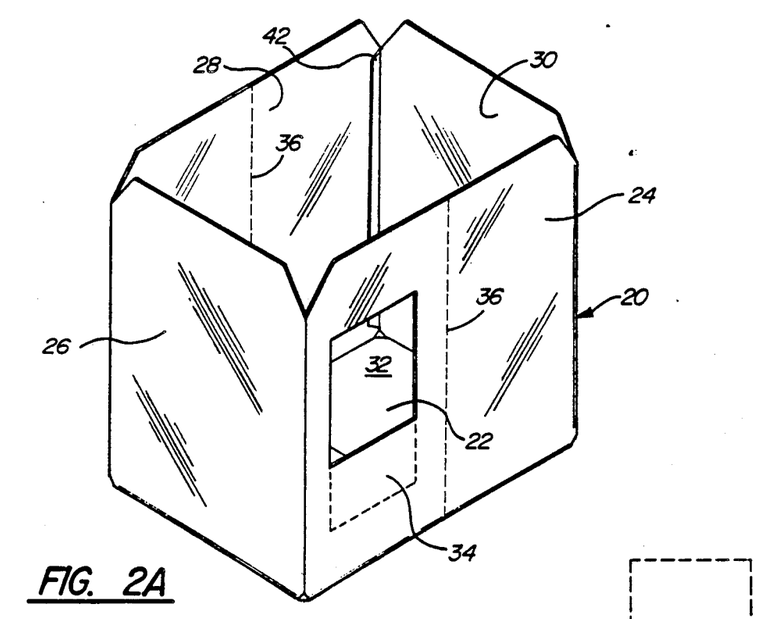
FIG. 2A is a perspective view of one configuration of the support skeleton structured in accord with the principles of the present invention.

Referring now to FIG. 2A there is shown a perspective view of a support skeleton 20 structured in accord with the principles of the present invention. The skeleton 20 of FIG. 2A is generally similar to that which is used in conjunction with the litter box 10 illustrated in FIG. 1. The skeleton 20 of FIG. 2A is configured as a generally box-like member having sufficient rigidity to support a lightweight, flexible bag 12. The skeleton 20 of FIG. 2A includes a generally closed base portion or floor 22 and a wall member surrounding the floor 22 in a non-planar relationship. In this embodiment, the floor is rectangular in shape and is surrounded by a wall member comprised of four generally planar walls 24, 26, 28, 30. Walls 26 and 30 are relatively narrow walls whereas walls 24 and 28 are relatively long walls and the overall shape of the skeleton is that of a rectangular box.

Disposed on one of the long walls 24 of the skeleton 20, proximate the long edge of the floor 22 and proximate the edge of the short side 26, is an opening 32 preferably configured to be sufficiently large to permit entry and exit of a cat. The opening 32 may similarly be placed in one of the shorter walls 26,30 of the skeleton; however, it has been found expedient in some instances to place the opening 32 as illustrated herein. The reason for this placement is that some small number of cats are prone to remain close to the entry port of a litter box, particularly when it is covered, and consequently when voiding urine, a cat thus placed may tend to spray out of the box and into the surrounding environment. If the opening 32 is placed in a long wall, for example 24, and if the narrow walls 26, 30 are of a length not significantly exceeding the nose to rump length of a cat, i.e., no more than one-third greater than the nose to rump length of the cat; a cat entering the box will be generally induced to turn and align with the long axis of the box and thus problems of urine spray are mitigated. It has been found that turning of the cat is even more strongly compelled if the threshold of the opening 32 is relatively high, since the high threshold will induce the cat to move forward. In one particular embodiment, the skeleton 20 of FIG. 2A was configured to be approximately 12 inches wide, 17 inches long and 18½ inches high. The door was 6 inches wide and 7 inches high and was placed 2½ inches from the corner of the skeleton and 7 inches from the floor. This skeleton fit a standard 30 gallon garbage bag, and more importantly, accommodated large 20 pound cats without problems of urine spray.

Problems associated with cats spraying urine out of a litter box opening are not particular to the present invention. In general, an enclosed litter box will induce apprehension in some cats causing them to shy from fully entering the box and thereby spraying their surroundings. The present invention recognizes this problem and solves it by placing the litter box entrance so as to compel the cat to enter and turn so that during use of the box, the entrance is to the cats side. This aspect of the invention will have advantages in the design of non-disposable litter boxes of various configurations.

It will be also be noted that the opening 32 includes a perforated portion 34 generally contiguous with the bottom thereof. The use of such a perforated portion allows for removal of a portion of the wall material to lower the threshold of the opening 32 and thereby permit the passage of kittens, which generally have problems negotiating a tall threshold. It is further to be noted that in the illustrated embodiment, the corners of the skeleton 20 are generally truncated or rounded. Such a configuration eliminates sharp projections which could tear a flexible bag when it is placed over the skeleton. It will further be noted that the long walls 24,28 include a partially perforated fold therein, illustrated by line 36. This fold permits the skeleton 20 to be compactly folded for storage and/or disposal.

Figure 2B:
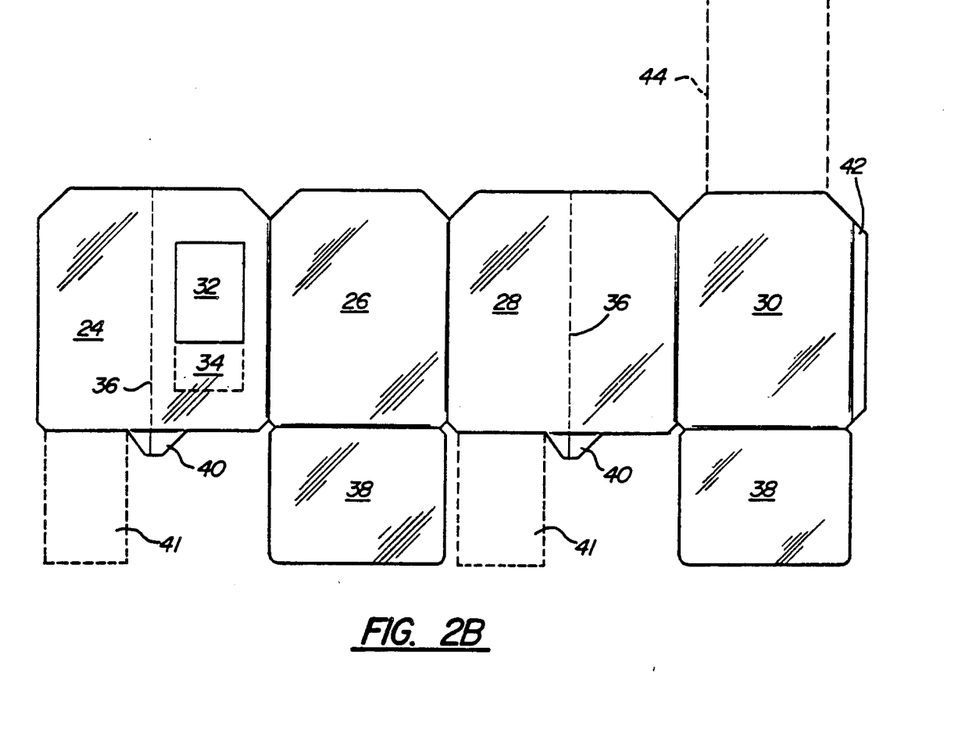
FIG. 2B is a plan view of a blank for the fabrication of the skeleton of FIG. 2A.

Referring now to FIG. 2B, there is shown a top plan view of a blank which may be folded to provide the skeleton 20 of FIG. 2A. Notable in the figure is the first long side 24 of the skeleton, including the opening 32 and perforated portion 34 therein; the first narrow side 26, the second long side 28 and the third narrow side 30 are similarly visible. Also visible are two large bottom flaps 38 attached to the narrow walls 26 and 30. When the bank is assembled into a box-like form, these large flaps 38 form the floor of the skeleton and provide a support base for the litter. Also visible are two small support flaps 40 attached to the long walls 24,28. These flaps function generally to support the large bottom flaps 38 and, when bent inward, stiffen the long walls 24,28 from bending at the folds 36.

It will be noted that the support flaps 40 are generally asymmetric, with a smaller portion thereof disposed to the left, in the FIG. 2B illustration, and with a larger portion disposed to the right. While many tab arrangements are possible within the scope of this invention, it has been found advantageous to reverse one of the tabs (i.e. to have a large portion to the left and a small portion to the right). This configuration eliminates interference during assembly.

It will be noted from the drawing of the blank that the corners are generally rounded or truncated to eliminate sharp points which could tear or snag the bag. It is further to be noted that the height of the narrow walls 26,30 is shown as being very slightly less than the height of the long walls 24,28 and consequently the folds between the bottom flaps 38 and the corresponding narrow walls 26,30 are not exactly aligned with the bottom edge of the long walls 24,28. This offset has been found to accommodate the thickness of the turned under large bottom walls 38 and to stabilize the assembled skeleton against inward collapse. As illustrated, the blank also includes an assembly tab 42 which is used to join the narrow wall 30 to the long wall 24.

Illustrated in phantom outline are two auxiliary flaps 41. These flaps 41 do not form part of the finished skeleton; however, they have been found useful in aligning the blank for the application of glue during assembly. These flaps are optional, and if included, are removed during assembly. It should also be noted that the opening 32 may, with equal advantage, be disposed in wall 28. By so disposing the opening 32, the blank is in some instances easier to handle, fabricate and assemble, depending on the particular methodology employed.

The skeleton depicted in FIG. 2A includes an open top surface. It has generally been found that closure of the bag-like member provides sufficient coverage to allow use of an open box. However, in some instances, it may be desirable to enclose the top of the box with a solid lid and toward this end, the blank may further be provided with a top flap, as for example the flap 44 illustrated in phantom outline in FIG. 2B. Obviously, top closure could be also accomplished by cooperation of a pair of flaps in a manner analogous to the bottom closure.

The litter box of the present invention is most advantageously provided in a compact form wherein the skeleton 20 is collapsed into a flat shape. The bag 12 may be disposed within the collapsed skeleton and the entire package shrink wrapped or similarly fastened; or alternatively, the bag may be used to contain the skeleton. When it is desired to utilize the litter box, the bag is opened and the folded skeleton inserted therewithin. The skeleton is then expanded by stretching apart the sides. The bottom flaps 38 fall into place and are retained by the small support flap 40. In this manner, the skeleton effectively assembles itself. This auto-assembly procedure eliminates problems of prior art devices which require insertion of assembled (usually litter-containing) boxes into a bag. Such prior art problems include spillage of litter, tearing of the bag and/or damage to the box. While auto-assembly is described with particular reference to the skeleton 20 of FIGS. 2A–2C, it is to be appreciated that this feature is found in the various other skeletons of the present invention, including those illustrated herein.

Figure 2C:
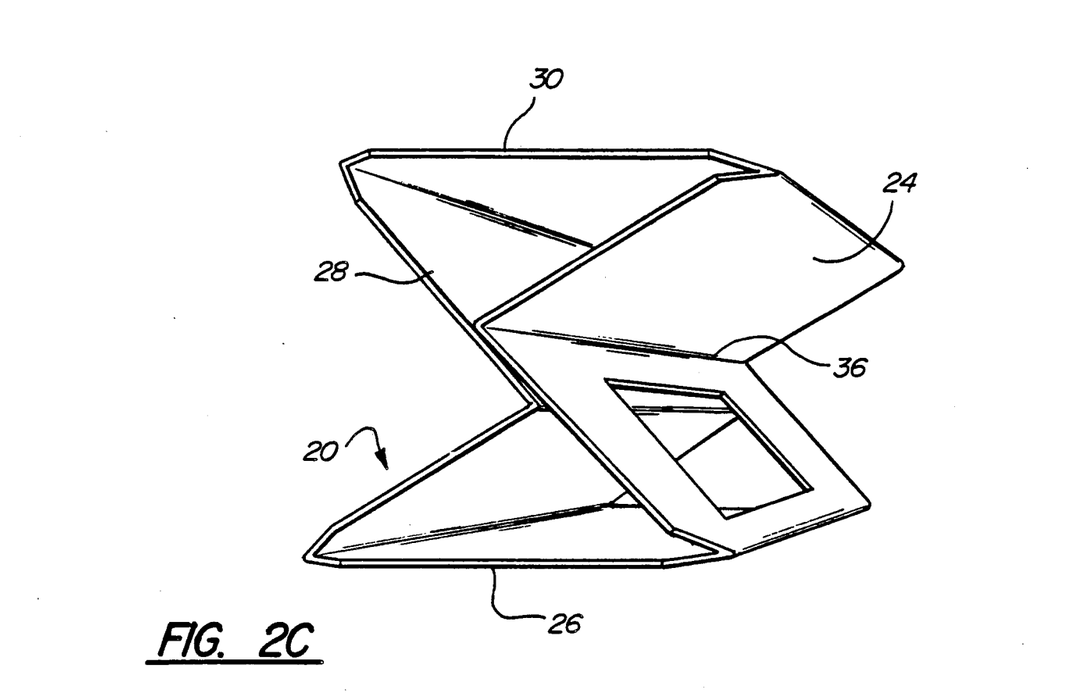
FIG. 2C is a perspective view of the skeleton of FIG. 2A in a partially assembled state.

FIG. 2C illustrates the support skeleton 20 in a partially folded form. It will be noted that the folds 36 in the long walls 24,28 permit those walls to be folded inward. In this manner, the folded skeleton presents a reasonably flat package of a length and width corresponding to that of the narrow walls 26,30.

The expanded skeleton provides a space bounded on 5 sides. Cat litter is placed in the space cooperatively defined by the skeleton and the supported bag. The bag is adjusted to tightly cover the top of the expanded skeleton and because of the shape of the skeleton, the bag snugly conforms to the contours of the skeleton. Any excess bag material proximate the base of the skeleton is tucked therebeneath. In this manner, a tidy, snug package is presented. The enclosed nature of the litter box allows use of low cost, relatively dusty litter material thereby obviating the need to buy high quality cat litter. After the litter is placed, the bag is tied about the top of the skeleton to enclose the package. A cut is then made in the bag, to provide an opening in communication with the opening 32 in the skeleton. As mentioned in connection with FIG. 1, this opening may be formed so as to leave a depending door flap. If the particular cat is not amenable to such a configuration, the flap may be completely removed to expose the door.

Figure 12:
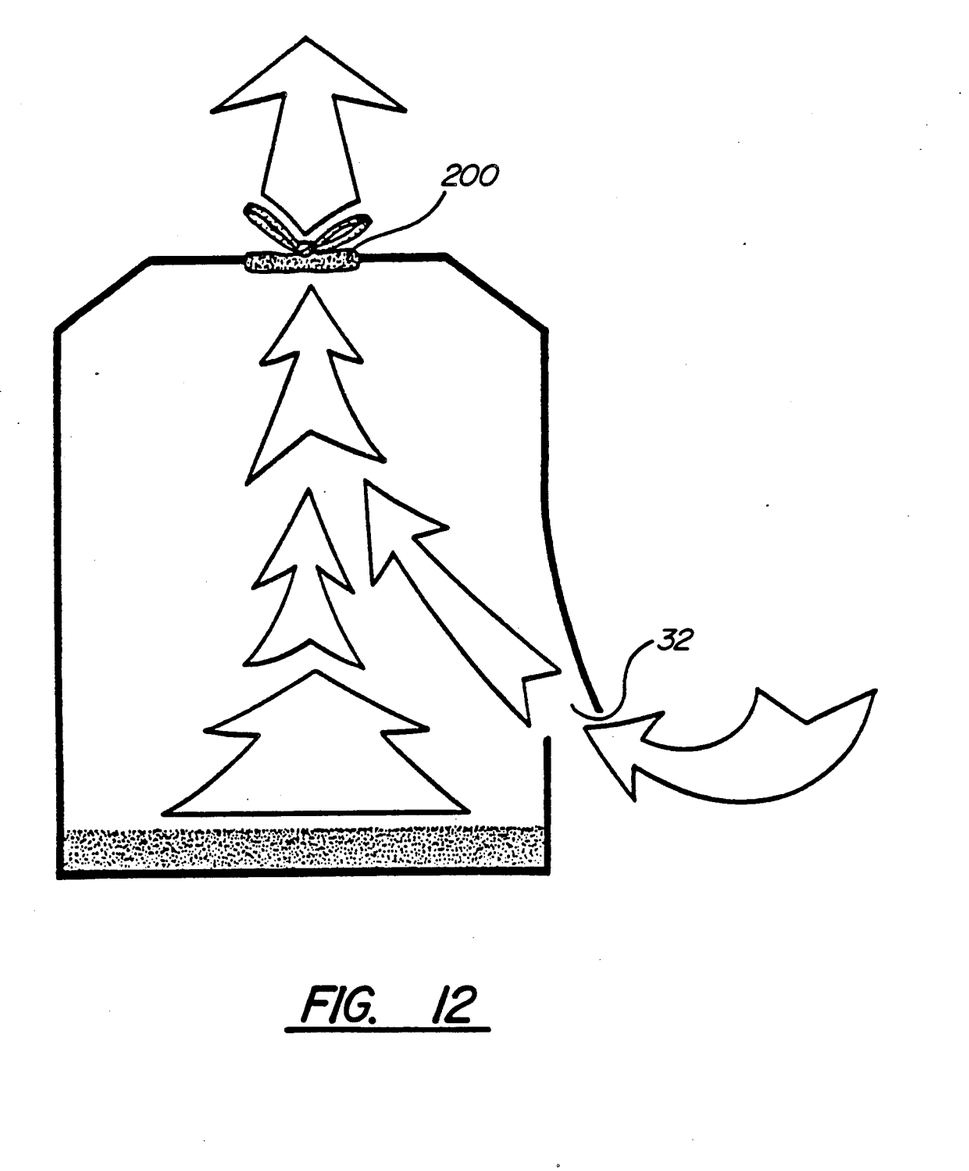
FIG. 12 is a schematic, cross-sectional view of a litter box of the present invention illustrating the use of a filter therewith.

In addition to enclosing the cat litter area, the litter box of the present invention may further provide filtration and ventilation of the interior of the litter box. FIG. 12 is a cross-sectional, schematic view of a litter box generally similar to that depicted in FIG. 1, but representative of the various embodiments of this present invention. The litter box is provided with a filter 200 disposed in the top thereof. If a filter is to be employed, the bag is drawn shut and tied so as to leave a relatively small opening (approximately 2–8 inches in diameter), at the closure. This opening is closed with an appropriate filter material. It has been found most expedient to utilize a body of cellulosic material such as paper toweling and the like as filter 200. This material is inexpensive, readily available and traps odors quite well while permitting a relatively unimpeded flow of air therethrough. In further refinements, the filter may be fabricated as a bactericidal or fungicidal-impregnated material and may further include carbon in the form of activated charcoal, bone black or the like for odor removal. As illustrated in the FIG. 12 embodiment, the filter 200, in combination with the door opening 32, creates a draft. Air passes into the door opening 32 and exits through the filter 200 drawing odors therewith. Obviously, the filter 200 may be placed other than at the top of the box and need not be utilized in conjunction with the bag closure but may be added by simply cutting a new opening into the bag.

As noted previously, in some embodiments of the invention, the top opening of the bag may be positioned to provide access for the cat. In other embodiments of the invention employing a side entrance to the litter box, the bag need not be tied shut at the top, but may simply be folded into the interior of the skeleton or tied about the exterior of the skeleton so as to leave the top of the litter box open. This embodiment is particularly suited for those cats who do not wish to be enclosed totally when using the litter box.

When it is time to replace the cat litter, the entire assembly may be simply disposed. If the assembly is lifted from the floor and shaken, the weight of the cat litter will push the support flaps 40 apart allowing the large bottom flaps 38 to fall downward, discharging the cat litter into the bottom of the bag and collapsing the skeleton. This provides for a relatively flat package which may be readily disposed, as for example by placing into a second plastic bag. Alternatively, an adhesive closure may be applied to shut the opening in the bag and the litter box can be neatly disposed of in a refuse container. Obviously, the used litter box may also just be tossed into a refuse container. The automatic disassembly of the skeleton presents a great advantage over prior art devices since the user need not reach into the bag to disassemble and collapse the litter box therein; thus, problems of spillage, release or odor and possible spread of infection are eliminated.

There are a wide variety of materials which may be employed to fabricate the skeleton. It has been found most expedient to fabricate this member from cardboard or other such rigid, low-cost material so as to allow for ready disposal. For example, cardboard of the type referred to as "E-flute" provides sufficient strength and rigidity combined with light weight and low bulk to allow for compact packaging of the folded litter box. Obviously, other grades of cardboard may be similarly employed. It may be expedient in some instances to provide the cardboard with a moisture-resistant coating and/or an odor control agent and/or a bactericidal agent.

Other types of materials may be similarly employed for the fabrication of the skeleton. For example, the skeleton may be fabricated from other types of paper, synthetic polymeric materials, rubber, wood, metal and like materials. In some instances it may be advantageous to reuse the skeleton. In those instances, it should be fabricated from a moisture impervious, relatively durable material such as a metallic or polymeric material. While the FIG. 2 skeleton has been described as having a closed bottom, the invention is clearly not so limited. This skeleton, as well as the others shown herein, may be fabricated with open bottoms, that is to say, they may comprise walls only. It is anticipated that open bottom support skeletons will be lined with several layers of newspaper or similar material prior to the introduction of litter.

Figure 3A:
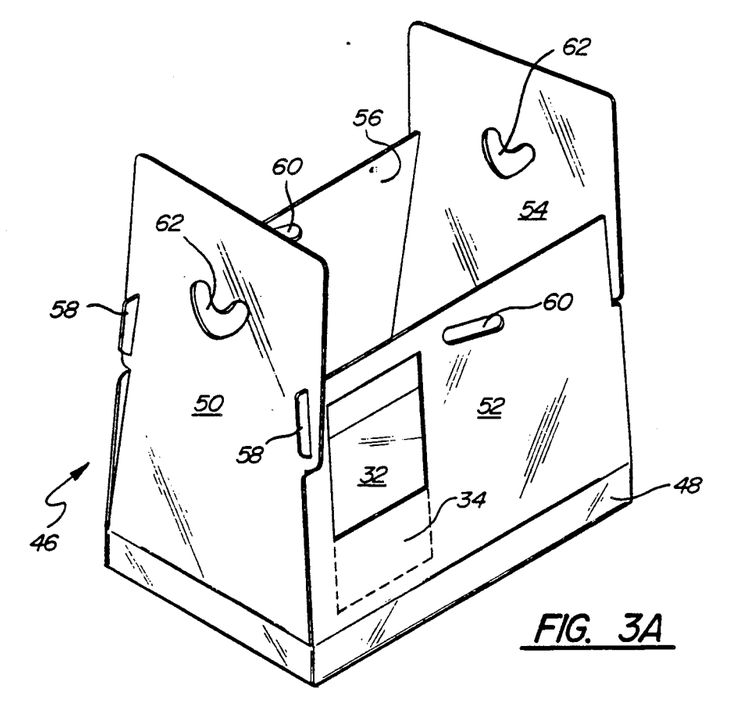
FIG. 3A is a perspective view of another support skeleton structured in accord with the principles of the present invention.

Referring now to FIG. 3A, there is shown another embodiment of support skeleton 46 structured in accord with the principles of the present invention. This skeleton 46 is configured to include a litter storage compartment and is intended to be supplied prefilled with cat litter material. Toward this end, the support skeleton 46 of this embodiment includes a generally rigid base portion 48 which forms a litter storage container. Disposed atop the storage base 48 are four flaps 50, 52, 54, 56 which interlock with tabs 58 to form the walls of the support skeleton 46. It will be noted that one of the long walls 52 includes an opening 32 therethrough of sufficient size for passage of a cat and generally similar to that previously described. There may also be included a removable perforated portion 34 to provide for access to the box by kittens.

The support skeleton 46 of FIG. 3A may further include a pair of handles 60 formed by cut-out portions of the long walls 52,56. These handles 60 are useful in positioning the support skeleton 46 within the bag. As illustrated, the narrow walls 50,54 of the skeleton 46 include a pair of cut-out openings 62 therein. These openings are structured to include an inwardly projecting tab portion which may be utilized to retain the bag thereupon. Furthermore, these openings 62 facilitate unfolding of the skeleton.

The litter box assembly of FIG. 3A is provided prefilled with cat litter. The litter is in the storage base portion 48 and the flaps 50, 52, 54, 56 are folded there atop to provide a flat, compact package.

Figure 3B:
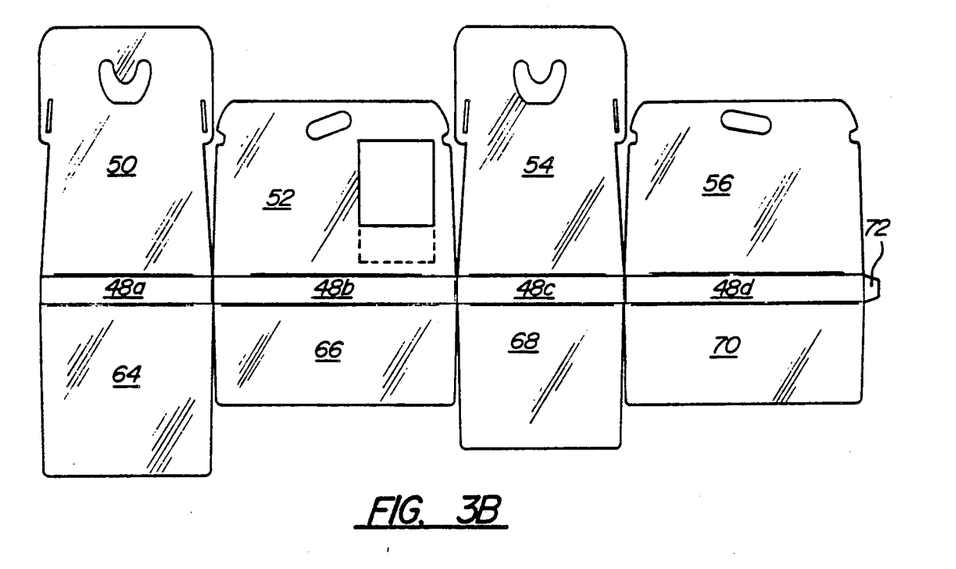
FIG. 3B is a top plan view of a blank for the fabrication of the support skeleton of FIG. 3A.
Figure 3C:
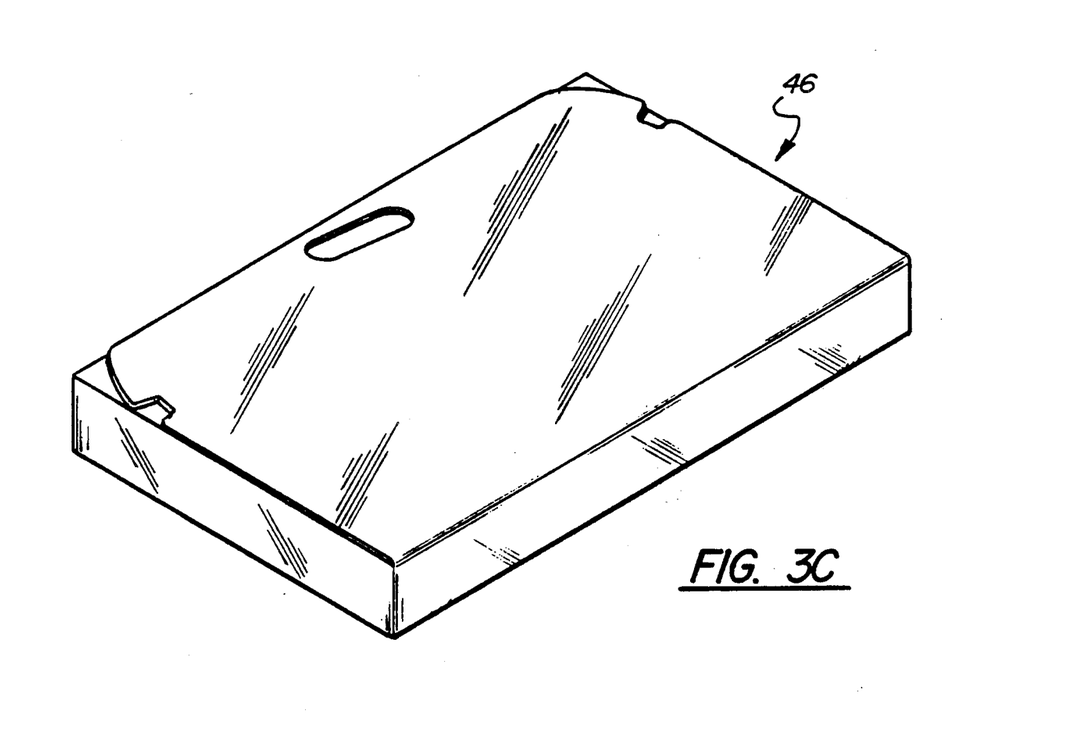
FIG. 3C is a perspective view of the skeleton of FIG. 3A in its closed state.

Referring now to FIG. 3C, there is shown the support skeleton 46 of FIG. 3A in its folded, first configuration. The flaps 50, 52, 54, 56 are collapsed atop, and generally coplanar with, the base 48. When it is necessary to use the litter box, the flaps 52 and 56 are unfolded so as to place the skeleton in a second configuration, which unfolding may be facilitated by the handles 60. The partially assembled skeleton 46 is placed in the bag, preferably by grasping the two handles 60 in a single hand and opening the bag with the other hand. Once in the bag, the remaining flaps 50,54 are raised in place and the skeleton is locked into a rigid, self-supporting third configuration by use of the tabs 58. In one preferred embodiment, the storage base of the skeleton is approximately 11×18×2 inches and holds approximately seven to ten pounds of litter. This particular support skeleton is configured to fit into a standard 30-gallon plastic trash bag. Once the skeleton has been placed within the bag, the top portion of the bag is drawn over the top of the skeleton and tied shut. In those instances where trash bags having an integral handle tie are utilized, the handles may be looped about the tabs of the cut-out openings 62. When the bag is tied shut, the walls of the skeleton are inwardly biased by the taut bag providing rigidity to the structure. In order to dispose of spent litter, the tabs may be disassembled and the walls collapsed; alternatively, the entire assembly may simply be crushed flat for disposal.

Referring now to FIG. 3B, there is shown a blank for the construction of the skeleton of FIG. 3A. Noted in the figure are the four side walls 50, 52, 54 and 56 as well as four generally smaller walls 48a–48d which will form the storage base. Contiguous with the four smaller walls 48a–48d of the storage base 48 are four bottom flaps 64, 66, 68, 70 which will form the floor of the storage base. The blank also includes an assembly tab 72. To assemble the blank of FIG. 3B the assembly tab 72 is glued or otherwise affixed to the first storage base wall 48a and the bottom flap 64, 66, 68 and 70 are folded inwardly and glued or otherwise affixed. The assembled blank is now ready for filling with litter. It is generally preferred that the appropriate bag be included with the litter filled support skeleton although the skeleton may be provided without a bag and the user may employ a standard trash bag.

Figure 4A:
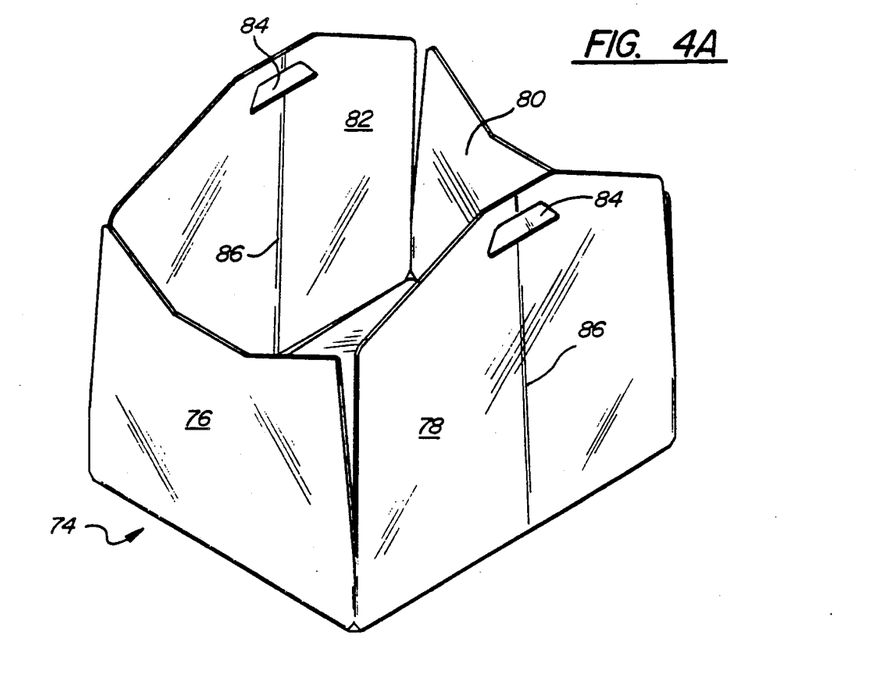
FIG. 4A is a perspective view of yet another support skeleton structured in accord with the principles of the present invention.

In some instances, particular cats will not care for a totally enclosed litter box, particularly if they have previously been accustomed to an open-tray style box. FIG. 4A represents yet another configuration of a support skeleton structured in accord with the principles of the present invention and designed to provide an open-tray type cat litter box. The support skeleton 74 of FIG. 4A is designed to be used in conjunction with a bag-like member, as the foregoing examples, however it is contemplated that the bag will be left open at the top portion.

This may be accomplished by folding the bag into the interior of the skeleton and optionally covering the inwardly folded portion with litter, or by fastening the bag proximate the top of the skeleton. The skeleton 74 of FIG. 4A includes four walls 76, 78, 80 and 82. In the depicted embodiment, walls 76 and 80 are relatively narrow walls in terms of length and are also short in terms of height. As illustrated, these walls may include a central, downward curving portion which provides ready access to the interior of the box, by a cat. The longer walls 78,82 of the skeleton 74 are configured to include two cut-out handle portions 84 which facilitate placement of the skeleton 74 in a bag and lifting thereof for disposal. The long walls 78,82 also include a fold 86 proximate the center thereof. This fold 86 facilitates collapse of the skeleton 74 during storage and disposal in a manner generally similar to that described with reference to the skeleton of FIG. 2A. It will also be noted that adjoining walls, as for example walls 76,78, are not joined along the totality of their common edge but are separated by a slit. As a result of this design, it is made more difficult for a cat to tip the litter box over. Pressure applied to a given wall simply bends that wall without imparting significant force to the remainder of the box. Presence of the slit also facilitates inward folding of opposing walls which permits the two handles 84 to be held in a single hand thereby facilitating assembly and disposal of the unit.

Figure 4B:
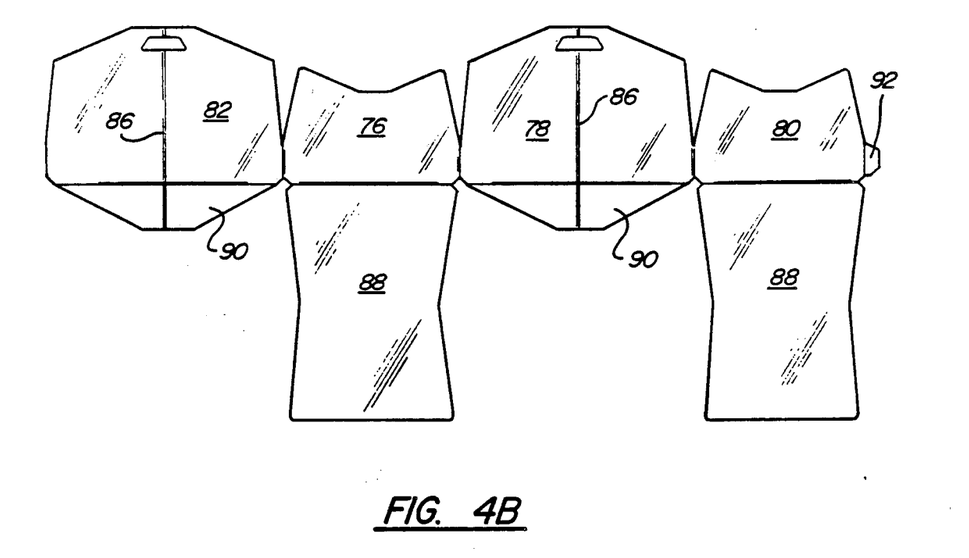
FIG. 4B is a top plan view of a blank for the fabrication of the support skeleton of FIG. 4A.

Referring now to FIG. 4B there is shown a blank for the construction of the support skeleton 74 of FIG. 4A. The blank includes the four sides 76, 78, 80 and 82. Also visible in FIG. 4B are the two bottom flaps which form the floor of the assembled skeleton 74. Also included are two bottom support flaps 90 which are generally similar to the flaps 40 of the FIG. 2B embodiment and which serve to support the bottom and prevent the sides 78 and 82 from folding inward during use. Also visible in FIG. 4B is an assembly flap 92. To assemble the blank of FIG. 4B, the assembly flap 92 is glued or otherwise affixed to side 82 proximate the bottom edge thereof. As in the foregoing examples, the corners of this particular skeleton may also be truncated so as to avoid damage to the bag. The manner in which adjoining sides are affixed along only a portion of their corresponding edges is clearly illustrated in FIG. 4B.

Figure 5A:
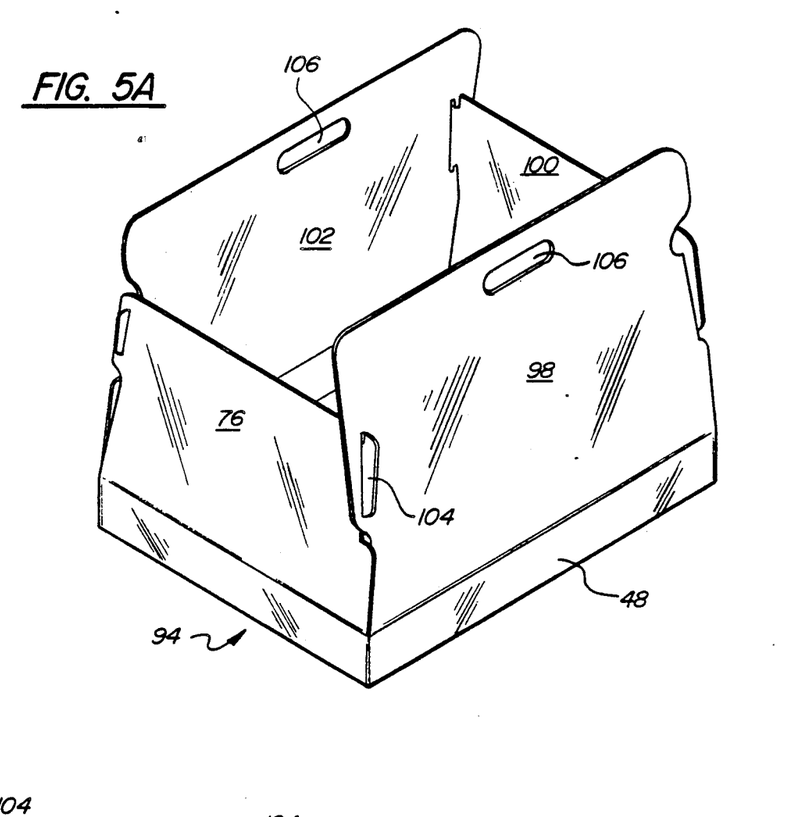
FIG. 5A is a perspective view of yet another support skeleton structured in accord with the principles of the present invention.

Referring now to FIG. 5A there is shown yet another embodiment of support skeleton 94 structured in accord with the principles of the present invention. The skeleton 94 of FIG. 5A is designed to provide an open top or tray-type litter box which is supplied prefilled with litter material. Towards this end, the skeleton 94 of FIG. 5A includes a storage base portion 48 generally similar to that described with reference to FIGS. 3A and 3B. The storage base portion 48 is, in this embodiment, approximately 12×17×2 inches and holds approximately seven to ten pounds of cat litter. The skeleton 94 of FIG. 5A further includes four wall flaps 96, 98, 100 and 102 provided with tabs 104 which function to lock the walls 96, 98, 100 and 102 together. The long walls 98, 102 are each provided with a cut-out handle 106 which, as mentioned previously, can be used to position and dispose of the litter box and it should be noted that the handles of this and other embodiments of the invention may be used even if they are covered by the bag since the material of the bag is generally quite thin and flexible. It will be noted that the narrow walls 96 and 100 are generally shorter than walls 98, 102 so as to facilitate entry of a cat into the box. It also should be noted that these walls can be further cut if passage of the cat is impeded.

Figure 5B:
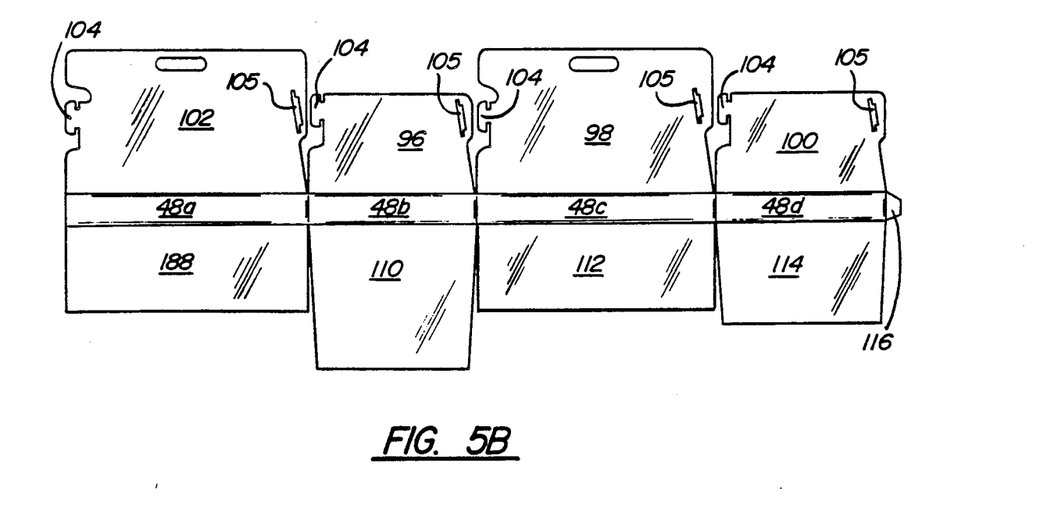
FIG. 5B is a top plan view of the blank for the fabrication of the support skeleton of FIG. 5A.

Referring now to FIG. 5B there is shown the blank for the construction of the support skeleton 94 of FIG. 5A. The blank includes four support base walls 48a–48d as previously described, each having associated therewith a bottom flap 108, 110, 112, 114. Also visible in FIG. 5B are the side walls 96, 98, 100, 102 and the tabs 104 and slots 105 associated therewith. The blank of FIG. 5B further includes an assembly flap 116 attached to storage base wall portion 48b.

In order to assemble the blank, the assembly flap 116 is glued or otherwise affixed to storage base wall portion 48a and the bottom flaps 108, 110, 112 and 114 are turned inwardly and fastened by adhesive or other well-known means. The rigid storage base portion 48 is then filled with cat litter material and the side flaps 96, 98, 100 and 102 are folded downward to enclose and protect the litter material. In use, the side flaps 98, 102 are opened, the handles 102 are held and the skeleton inserted in the bag. Once the skeleton is properly placed, the walls 96, 100 are unfolded and the tabs 104 locked. In this embodiment, as in the embodiment of FIG. 4A, the litter box is of the tray type and consequently the bag does not close above the skeleton.

Figure 6:
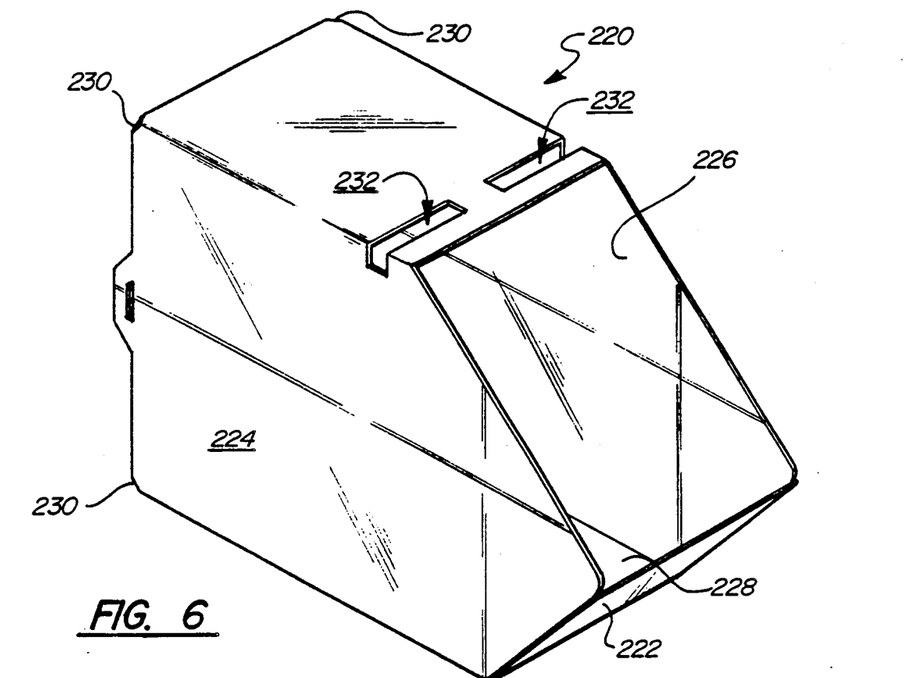
FIG. 6 is a perspective view of yet another support skeleton structured in accord with the principles of the present invention.

Referring now to FIG. 6, there is shown yet another support skeleton 220 structured in accord with the principles of the present invention. The skeleton 220 of FIG. 6 is configured to provide litter retaining means proximate the opening for minimizing scatter of litter from the interior space of the litter box.

In this particular embodiment, the litter retaining means is provided by one of the walls 222 of the skeleton operative in conjunction with triangular portions of the adjoining walls 224,226. This skeleton 220 includes a base 228 of generally rectangular configuration. The base has four walls aligned therewith. Three of the walls 224,226 and the rear wall, not visible in this drawing, all are disposed at approximate right angles to the base. The fourth wall 222 is disposed at an obtuse angle to the base and is generally shorter than the other four walls. The two side walls 224,226 adjacent the front wall 222 include triangular portions coplanar therewith and projecting toward the front of the skeleton. These triangular portions join along one surface with the front wall 222 and when retained by the bag-like member (as will be shown in FIG. 7), provide a front entrance to the litter box assembly which minimizes tracking of litter from the interior thereof.

The skeleton of FIG. 6 preferably includes truncated corners 230, as previously described, which minimizes tearing of the bag. It will also be noted that the skeleton 220 of FIG. 6 includes a pair of slots 232 formed in the top thereof. These slots, as will be explained in greater detail with reference to FIG. 7, allow for greater retention of the bag upon the skeleton.

Figure 7:
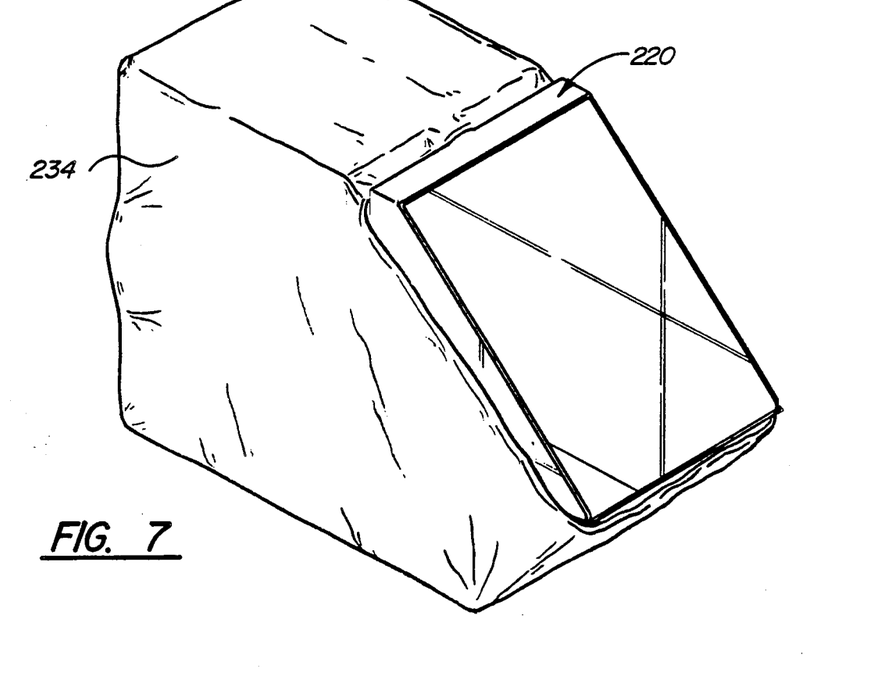
FIG. 7 is a perspective view of the support skeleton of FIG. 6 shown as utilized in conjunction with a bag-like member.

Referring now to FIG. 7, there is shown the skeleton 220 of FIG. 6 as deployed in conjunction with a bag 234. The skeleton 220 is placed into the bag 234 such that the front opening of the skeleton aligns with the opening in the bag 234. The opening in the front of the skeleton is preferably configured to have a perimeter which is slightly greater than the perimeter of the bag opening. The bag opening is thus stretched slightly when the skeleton is assembled. The two open slots (232 in FIG. 6) receive the a portion of the perimeter of the opening, thereby tightening the opening of the perimeter about the skeleton and thus retaining the front wall 222 in alignment with the triangular portion of the side walls 224,226.

Figure 8:
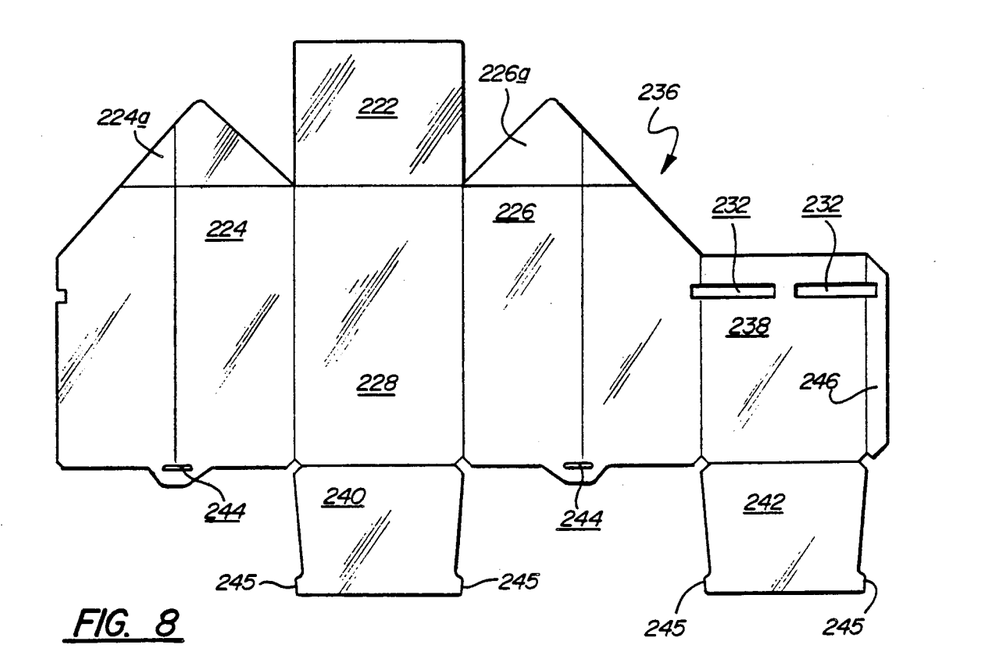
FIG. 8 is a top plan view of a blank for the fabrication of the support skeleton of FIG. 6.

Referring now to FIG. 8, there is shown a blank 236 for the assembly of the skeleton 220 of FIG. 6. The blank 236 includes a base portion 228, sidewall portions 224 and 226, a top member 238, a front wall 222 and two flaps 240,242 which will constitute the rear wall of the skeleton.

The two side walls 224,226 each include a generally triangular portion 224a,226a as previously noted as well as an assembly slot 244. Each slot engages corresponding tabs 245 on the flaps 240,242 which form the rear wall of the litter box. As previously noted, the skeleton includes a pair of slots 232 in the blank. These slots are primarily disposed on the top member 238 although a portion of one slot extends onto one of the sidewalls 226. The other sidewall 224 includes a cut-out notched portion. An assembly flap 246 is attached to the top member 238 and is utilized to join that top member 238 to the corresponding side wall 224.

It should be apparent from the drawings that the blank 236 may be configured into a skeleton which can be readily knocked down into a flattened shape for disposal by simply removing the tabs 245 on the back wall flaps 240,242 from their corresponding slots 244.

Figure 9:
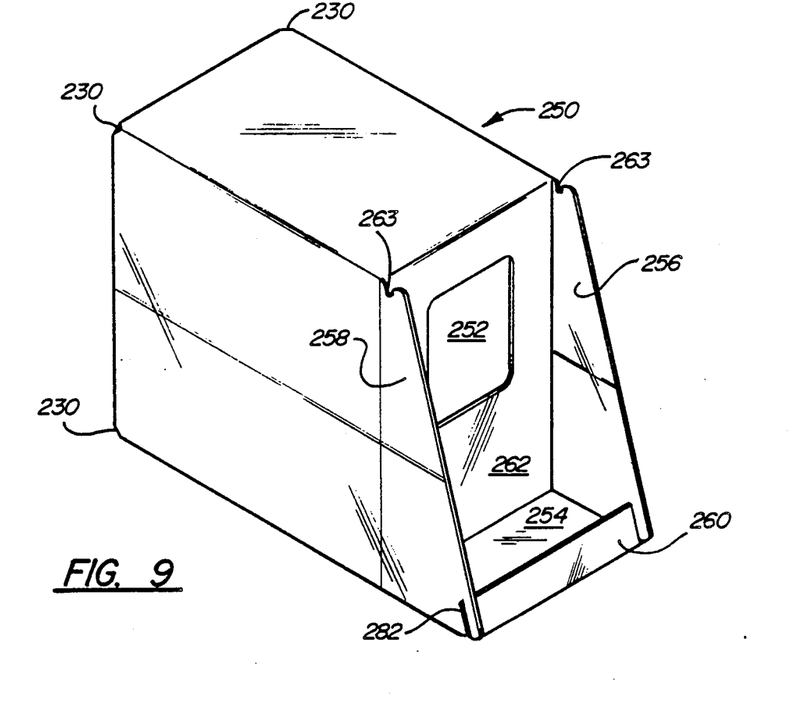
FIG. 9 is a perspective view of a support skeleton of the present invention including a litter containing vestibule.

Referring now to FIG. 9 there is shown yet another skeleton 250 structured in accord with the principles of the present invention. The skeleton 250 of FIG. 9 includes a vestibule portion proximate the opening 252. This vestibule serves to trap and retain litter scattered from the interior of the litter box. The vestibule is configured to include a base 254, a pair of upstanding sidewalls 256,258 and a short front wall 260. The side walls 256,258 include a set of bag retaining notches 263,282 therein. Although not visible in this drawing and as will be discussed below with reference to FIG. 11, the skeleton further includes an inwardly folded flap 280 associated with the front opening wall 262 of the skeleton 250. This flap 280 is located at the base of the front skeleton wall 262 proximate that wall's junction with the vestibule base 254. The flap is folded inward and prevents litter and/or excreta from passing through that juncture. Skeleton 250 of FIG. 9 generally includes truncated corners 230 and a pair of notches 263 in the triangular vestibular sidewalls 256,258.

Figure 10:
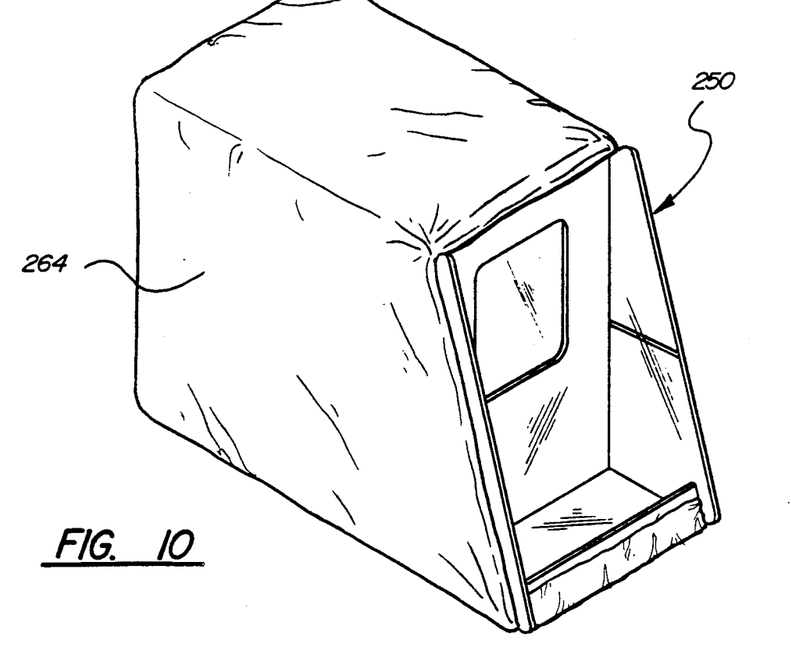
FIG. 10 is a perspective view of the support skeleton of FIG. 9 as utilized in conjunction with the bag-like member.

Referring now to FIG. 10, there is shown the skeleton 250 of FIG. 9 as enclosed in a bag 264. The bag 264 is wrapped about at least a portion of the triangular side walls 256,258 and a portion of the edge of the opening of the bag is retained by the notches 263 and 282 described with reference to FIG. 9. Preferably, the skeleton 250 is configured such that the perimeter of the front is slightly larger than the perimeter of the bag opening so that the bag is tautly retained by the skeleton. The opposite edge of the bag is wrapped about the front vestibular wall 260 and the tension of the bag retains that wall 260 in position. In use, the assembly of FIG. 10 provides a cat litter box having a front vestibule or porch with a short upstanding wall. This arrangement minimizes the scatter of litter which is tossed or tracked from the interior of the litter box.

Figure 11:
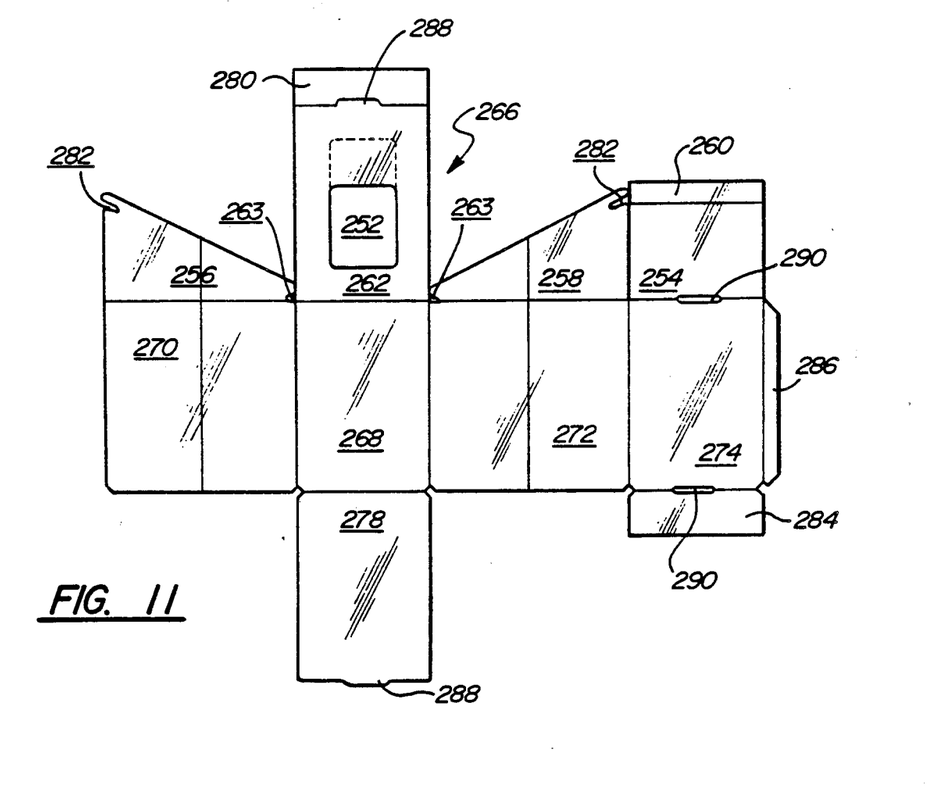
FIG. 11 is a top plan view of a blank for the fabrication of the support skeleton of FIG. 9.

Referring now to FIG. 11 there is shown a blank 266 for the fabrication of the skeleton 250 of FIG. 9. The blank 266 includes a top member 268 which will form the upper surface of the skeleton, side walls 270,272, a bottom member 274 and a rear wall member 278. The skeleton further includes a front wall member 262 having an opening 252 therein; as in the foregoing examples, the front opening 252 may be enlarged to accommodate differing sizes of cats as is indicated by the phantom outline.

Also notable in the blank of FIG. 11 are the two vestibular or side walls 256,258, of generally triangular configuration, as well as the floor 254 and front wall 260 of the vestibule. Attached to the front wall of the skeleton 262 is a flap 280; and this flap as previously discussed, is folded inward to retain litter. The triangular side walls 256,258 of the vestibule include a first set of notches 282 as well as a second set of notches 263 for retaining the bag as previously described.

The blank 266 further includes a second flap 284 associated with the base 274. This flap 284 is folded outward of the rear wall 278. It is retained by the bag and functions to limit outward travel of the rear wall 278. The blank 266 of FIG. 11 is assembled by means of an assembly flap 286 as previously described with reference to other embodiments. In use, the blank is assembled into the skeleton 250 of FIG. 9, by folding flaps 280,284 inward and inserting the tabs 288 associated with the front 262 and rear walls 278 into corresponding slots 290 in the base 274.

The present invention is a simple to manufacture and easy to use cat litter box system which eliminates the hazard and unsightly appearance of cat litter material. The litter box presents a generally rugged, moisture impervious, tear-proof enclosure to the cat which eliminates hazards of spilled litter occasioned by claw damage to heretofore employed plastic bags. The particular support skeleton configuration may be selected to enable compact storage and disposal thereof and toward that end, several such embodiments have been presented herein.

In addition to the particular skeleton configuration shown in the figures, it is to be understood that the present invention generally and broadly encompasses interiorly disposed support skeletons. Specifically, the skeleton of the present invention may be configured as a wire frame member. Alternatively, the skeleton may be assembled from a plurality of tubular members interconnected to form the corners thereof. In another embodiment, the skeleton is fabricated from a foamed polymeric material. In the foam embodiment, the skeleton may be made from a resilient foam which compresses to a compact shape for storage or disposal.

It is to be appreciated that the present invention is not solely limited to cat litter boxes but rather, it provides a simple and efficient system and method for the disposal of many types of waste. The concept of employing an interior support skeleton in conjunction with an exterior bag-like member represents an improvement over heretofore employed waste disposal methods, which methods generally involve support of a relatively flexible litter disposal bag by an exteriorly disposed framework. As discussed with reference to cats, a waste disposal system in which a relatively thin, flexible bag is in direct contact with refuse can cause problems insofar as sharp objects can cut or tear the bag. The present invention provides an internal support skeleton which in addition to maintaining a waste disposal bag in a supported configuration, can in some embodiments protect the bag from damage occasioned by metal, broken glass or other sharp objects.

It is also to be appreciated that while the foregoing has been described primarily with reference to a litter box for felines, obviously, the invention is not so limited. There are a number of domesticated and semi-domesticated animals kept as pets, which can be trained to use a litter box. Included therein are skunks, ferrets, pigs and raccoons. By appropriately sizing the support skeleton, the present invention may be readily adapted to accommodate such animals. It should also be noted that the skeleton, although described in terms of a generally rectangular shaped member, may be configured in a variety of shapes. For example, the base may be triangular, pentagonal, circular or of any other polygonal shape.

In light of the foregoing, it will be apparent that there are many modifications and variations of the present invention which will be obvious to one of skill in the art. Accordingly, the foregoing drawings, discussion, description and examples are merely meant to illustrate particular embodiments of the invention and are not meant to be limitations upon the practice thereof. It is the following claims, including all equivalents, which define the scope of the invention.

I claim:

1. A litter box for felines and the like comprising:
   a generally boxlike member including a rectangular base, said base having first and second short edges and first and second long edges;
   a rear wall, which is generally rectangular and which is disposed at right angles to, and coextensive with, the first short edge of the base;
   a front wall which is generally rectangular and of the same dimensions of the rear wall, said front wall including an opening therethrough, said front wall disposed at right angles to the base at a location between, and parallel to, the first and second short edges so that a projecting portion of the base is defined between the front wall and the second short edge of the base;

first and second side walls, each wall being a trapezoid having two right angles and each having a bottom edge with a length equal to the length of the long edge of the base and a top edge, which is generally parallel to the bottom edge and equal in length to the spacing of the front and rear walls, said side walls being disposed at right angles to the base with the bottom edges thereof aligned with the long edges of the base so that a right triangular portion of each side wall projects past the front wall;

a top member which is generally rectangular and disposed at right angles to said side walls, the top member having a width equal to the spacing of the side walls and a length equal to the spacing of the front and back walls, said boxlike member being configured so that the projecting triangular portions of the walls and the projecting portion of the base cooperate to define a vestibule disposed proximate the front wall thereof.

2. A litter box as in claim 1, further including a front vestibule wall disposed between said triangular portions of the first and second side walls and generally coextensive with the second short edge of the base.

3. A litter box as in claim 2 further including a flexible, bag-like member enclosing and supporting by the boxlike member, said bag having an opening therein which is generally aligned with the opening in the front wall.

4. A pet litter box assembly for felines and the like comprising:

I. a box having:
  a generally rectangular base having a first and a second short edge and a first and a second long edge;
  a rear wall disposed at right angles to the first short edge of the base and having a preselected height;
  a generally rectangular top member spaced from and in a plane parallel with the base, said top member having a width equal to the short edge of the base and a length which is less than the length of a long edge of the base;
  first and second side walls of pentagonal configuration each including: a bottom edge equal to the length of a long edge of the base, a rear edge disposed at right angles to the bottom edge and equal to the height of the rear wall and a top edge disposed at right angles to the rear edge and equal in length to the length of the top member, each side member further including a lower front edge and an upper front edge, said first and second side members disposed in a spaced apart, plane parallel relationship such that the bottom edges thereof are each coextensive with one of said long edges of the base and said side members are perpendicular to the rear wall and the top member;
  a front wall of generally rectangular configuration having a first edge thereof generally coextensive with, and of a length equal to the second short edge of the base, said front wall disposed in a perpendicular relationship with each of said first and second side members;
  said base, first and second side members, rear wall, top and front wall cooperate to substantially enclose an interior volume and to define an opening bounded by the upper front edges of said first and second side members, an edge of said top member and an edge of said front wall; and II. a flexible, bag-like member enclosing and supported by said box, said bag-like member including an opening therein generally aligned and communicating with said opening.

* * * * *